(12) United States Patent
Orban

(10) Patent No.: US 7,859,152 B2
(45) Date of Patent: Dec. 28, 2010

(54) SUBMERSIBLE DIRECT-CURRENT ELECTRIC MOTOR

(75) Inventor: Jacques Orban, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 120 days.

(21) Appl. No.: 11/870,483

(22) Filed: Oct. 11, 2007

(65) Prior Publication Data
US 2008/0088189 A1 Apr. 17, 2008

(30) Foreign Application Priority Data
Oct. 11, 2006 (RU) ............................... 2006136067

(51) Int. Cl.
*H02K 5/10* (2006.01)
(52) U.S. Cl. ...................... 310/87; 310/232; 310/245; 310/249
(58) Field of Classification Search ................ 310/87, 310/68 R, 232, 245, 249, 140–149
See application file for complete search history.

(56) References Cited

U.S. PATENT DOCUMENTS

| | | | | |
|---|---|---|---|---|
| 3,631,273 A | * | 12/1971 | Stein ........................... | 310/309 |
| 3,673,447 A | * | 6/1972 | Zumbach et al. ............ | 310/227 |
| RE30,761 E | * | 10/1981 | Ban et al. .................... | 388/819 |
| 4,311,935 A | * | 1/1982 | Hoyss ......................... | 310/227 |
| 4,347,453 A | * | 8/1982 | Gaus ........................... | 310/104 |
| 4,708,547 A | * | 11/1987 | Baron ......................... | 409/233 |
| 4,822,958 A | * | 4/1989 | Van Laere ................... | 200/1 V |
| 5,633,792 A | * | 5/1997 | Massey ....................... | 363/109 |
| 6,376,926 B1 | * | 4/2002 | Ruiz ............................. | 290/2 |
| 6,749,532 B2 | * | 6/2004 | Wachauer ..................... | 475/5 |
| 7,397,153 B2 | * | 7/2008 | Buck et al. .................... | 310/50 |
| 2007/0152523 A1 | | 7/2007 | Bookout | |

FOREIGN PATENT DOCUMENTS

GB 2436751 A 10/2007
WO 2004114498 A3 12/2004

* cited by examiner

*Primary Examiner*—Thanh Lam
(74) *Attorney, Agent, or Firm*—Kevin B. McGoff; Rodney Warfford

(57) ABSTRACT

The claimed invention relates to a submersible direct-current electric motor to be used, in particular, for driving a submersible pump in downhole oil production. The claimed motor includes a fixed armature winding; a housing which encloses the armature winding and rotates around it; magnetic field generation means which are fixed in the housing and interact with the armature winding to generate electromagnetic torque; a fixed collector which is electrically connected to the armature winding; brushes which rotate around the fixed collector and are connected to the external electric circuit. The fixed collector and the brushes rotating around it are enclosed in an insulating chamber. The technical result consists in the elimination of the risk of a short circuit between the brushes and the collector of the direct-current motor when it is used as a submersible motor.

17 Claims, 2 Drawing Sheets

SUBMERSIBLE DIRECT-CURRENT ELECTRIC MOTOR

TECHNICAL FIELD

The invention relates to a submersible direct-current electric motor to be used, in particular, as a submersible pump drive in downhole oil production.

BACKGROUND ART

Presently, induction motors are used as submersible motors in various applications, including driving submersible electric pumps in oil fields. In some applications, an induction motor is a single-phase alternating-current motor. But its three-phase model is used more frequently. The induction motor operation philosophy is based on the interaction between a rotating magnetic field that occurs when three-phase alternating current passes through the stator windings, and the current induced by the stator field in the rotor windings, which results in occurrence of mechanical forces that make the rotor rotate in the direction of the rotating field rotation, provided that the rotor rotation speed is lower than the field rotation speed. So, the rotor rotates asynchronously with respect to the field. The disadvantages of induction motors include a limited rotation speed control range and considerable reactive power consumption under the low-load conditions. Moreover, the speed control system is rather complicated due to the need to adjust the frequency of current, and the presence of three wires in the winding makes this adjustment a rather difficult process.

The above-mentioned problems could be solved by using a direct-current motor. Operation of direct-current motors is based on the interaction between current conductors and magnets, which results in occurrence of electromagnetic torque. These motors are characterized by a very compact design, which provides a high current density in the primary winding. Such machines operate in a wide rotation speed range and have a rather simple control system. However, the main disadvantage of these motors when used as submersible pump drives is that a short circuit occurs between the brushes and the collector when the motors are submerged into a fluid, particularly, into an electrically conducting fluid. This may cause damage to the brushes and/or to the collector.

DISCLOSURE OF THE INVENTION

Therefore, the problem to be solved by the invention is to provide an electric motor that could be used as a submersible pump drive, could have a simple control procedure, could provide a wide rotation speed control range and could be easily fabricated and mounted (particularly, in oil production wells).

The problem is solved by using a submersible direct-current motor that includes:

an armature winding which is fixed and forms the central part of the motor;

a housing which encloses the armature winding and is capable of rotating around the armature winding;

magnetic field generation means which are fixed in the housing;

a collector which is made fixed and is electrically connected to the armature winding;

brushes which are capable of rotating around and sliding along the fixed collector. The brushes are connected to the external electric circuit, and the fixed collector, together with the brushes capable of rotating around it, is enclosed in an insulating chamber.

The possibility of occurrence of a short circuit between the collector and the brushes has been eliminated by placing them in the insulating chamber. Moreover, the motor contains no rotating shaft to be sealed, because the collector and the armature winding are made fixed. This ensures that the insulating chamber and, consequently, the contacts between the brushes and the collector are properly sealed.

So, the placement of the brushes and the collector in the insulating chamber, on the one hand, and fixed position of the collector and the armature winding, on the other hand, ensure that the contact area between the brushes and the collector is properly sealed, which, in combination with well-known properties of direct-current motors (i.e. simple control, wide rotation speed control range, easy fabrication), provides a solution to the above problem.

Additional improvements of the claimed submersible direct-current motor are descried below.

Permanent magnets, electromagnets or excitation windings can be used as the magnetic field generation means.

A fixed collector ring can be provided for in order to connect input wires of the power cable to the rotating brushes. In this case, the wires are be connected to the fixed collector ring along which the brushes slide during the rotation process. The advantage of this embodiment is that the wires of the power cable are fixed and can therefore be reliably sealed in the wall of the insulating chamber.

The collector ring can be made in the form of two separate ring elements which are separated from each other and are either arranged concentrically, or are spaced apart along the direct axis. Alternatively, the collector ring can be equipped with two tracks which are separated from each other and along which the brushes move. Each ring element or track is connected to the respective polarity wire.

A rotatable ring installed inside the insulating chamber is used for the installation of the brushes. Each brush can be made in the form of a single brush which contacts the collector and the collector ring at the same time. Alternatively, each brush can be made of two separate brushes which are electrically connected to each other. One of these brushes interacts with the collector, and the other one interacts with the collector ring. Each brush should preferably be installed in the rotating ring and should be removable.

The wires of the power cable can be connected to the collector ring either directly or through an intermediate connection, which is more preferable. The intermediate connection can be a quick-disconnect connection made in the wall of the insulating chamber and connected to the collector ring. The wires of the power cable can be connected to this quick-disconnect connection, thus allowing an easy and quick preparation of a submersible motor to downhole installation (preparation to operation). A plug-in connection can be used as such a quick-disconnect connection.

The rotation can be transmitted from the motor housing to the brushes by different means. In one of the embodiments, the rotation is transmitted by a mechanical means. A rotatable shaft installed in the wall of the insulating chamber can be used as such a mechanical means. One end of the shaft is made in such a way as to allow form closure with the rotating housing of the motor, and the other end of the shaft is made in such a way as to allow form closure with the brushes, either directly or indirectly (i.e. through the rotating ring). The form closure can be implemented by using a toothed gear, a tongue-and-groove joint, etc. Alternatively, the connection between the shaft and the motor housing or between the shaft and the brushes or the rotating ring containing the brushes can be implemented by using force closure due to frictional forces or magnetic attraction, or by using a combination of the form closure and the force closure. The shaft should be properly sealed at the point where it is installed, in order to ensure that the insulating chamber is sealed. In case that the claimed motor is used in a low-pressure surrounding fluid, it is possible to use a rotating seal, e.g. a ring seal or a spring-loaded seal. However, in case of a substantial pressure differential, this seal alone may not be sufficient. In this case, in addition to the use of the rotating seal, the insulating chamber can be filled with an insulating fluid (e.g. pressure oil) which limits the pressure differential across the rotating seal.

Alternatively, the rotation can be transmitted from the rotating housing of the motor to the brushes by means of magnetic interaction through the wall of the insulating chamber. In this case, there are external magnets which are rotated directly by the rotating housing of the motor and are, consequently, installed thereon. In other embodiments, external magnets can be installed on a rotating part driven by the motor housing. When rotating, the external magnets interact with the internal magnets which are connected to the brushes either directly or indirectly (i.e. through the rotating ring), thus causing the brushes to rotate. So, the external and internal magnets form a so-called magnetic coupling. In this embodiment, there are no parts passing through the wall of the insulating chamber and, consequently, no parts to be sealed. It is therefore possible to fully seal the insulating chamber, using static seals. This design is particularly preferable in case that the liquid medium surrounding the motor is kept at high pressure or is rather corrosive (i.e. contains abrasives, active chemical compounds, etc.). When using a magnetic coupling, the walls of the insulating chamber should be made of a material having low ferromagnetic properties, so that a magnetic flux could pass through the wall. Besides, this material should have low conductivity in order to limit the swirl that occurs during the rotation of the magnetic flux. Plastics, ceramic materials or composite materials, stainless steel, titanium, bronze, etc. can be used as such materials.

The advantage of the above embodiment involving the use of a magnetic coupling is that the brushes may lag behind the rotating housing. This lag results from the friction of the brushes against the collector (frictional lag), and from the inertial effect that occurs during the acceleration (inertial lag), particularly, during the start-up. The lag reduces the torque of the motor, thus allowing downhole submersible electric motors to avoid the risk of failure of the motor shaft or the tubing to which the motor or the submersible pump driven by the motor is connected, due to great inertial forces occurring during the start-up as a result of high acceleration.

The inertial lag can be further increased by using an elastic coupling provided for between the magnetic coupling and the brushes. During the start-up or acceleration, the elastic coupling twists under high torque which is required for the acceleration of the brushes. As a result, the motor torque decreases, and equilibrium is established between the acceleration of the motor and the lag of the brushes.

A permanent-lag correcting system can be provided for in one preferable embodiment. The permanent-lag correcting system is intended for reduction or even full elimination of the frictional lag of the brushes. The frictional lag along with the inertial lag allows elimination of the damage caused to the motor shaft during the acceleration of the brushes. But, on the other hand, this lag generally has a substantial negative impact on the maximum torque of the motor, considering its constant effect during the operation of the motor. So, the frictional lag should be eliminated or properly corrected after the acceleration phase has ended. For this purpose, the above-mentioned permanent-lag correcting system is used.

The permanent-lag correcting system corrects an angle error between the external and internal magnets, i.e. makes a slight angular movement sufficient for elimination of the angle of lag. Such a correcting system may include a correcting electromagnet and two small alternating-current generators of the same type. The generators are installed on the corresponding parts of the motor in such a way that their output powers are equal and their phases are opposite in case of a fully aligned magnetic coupling. The total of the output powers is therefore equal to zero and no current passes through the correcting electromagnet.

The permanent-lag correcting system should preferably be equipped with a low-pass filter which is used for correction during the acceleration, in order to avoid mutual cancellation of the friction correction effect and temporary lag effect during the acceleration.

BRIEF DESCRIPTION OF THE DRAWINGS

Other possible improvements and advantages of the claimed invention will become apparent from the following more detailed explanation of the examples which are explained, using drawings. The drawings show the following:

BEST MODE FOR CARRYING OUT THE INVENTION

Figure 1:
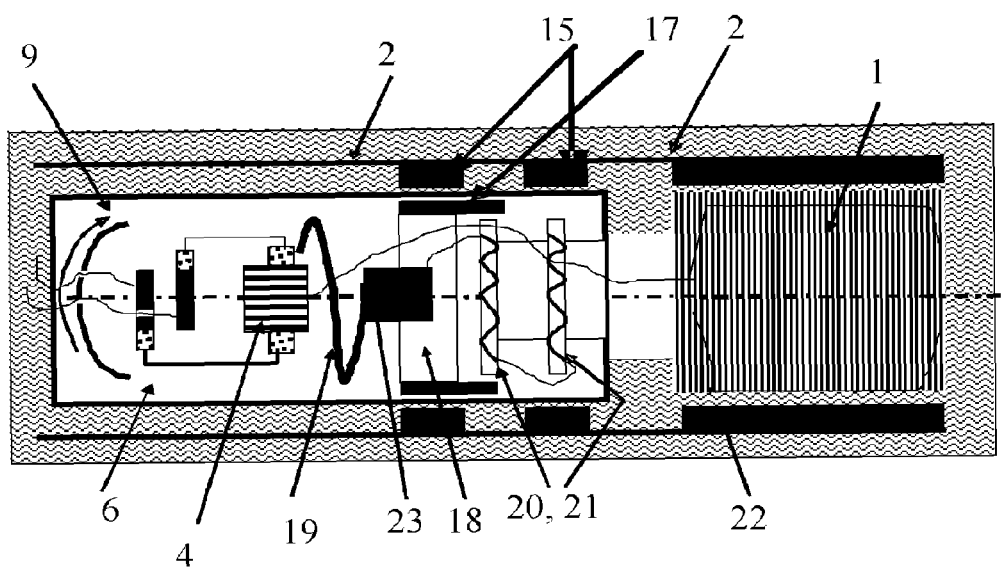
FIG. 1 shows a submersible electric motor with mechanically rotated brushes.

The submersible direct-current electric motor corresponding to the invention includes an armature winding (1) which is fixed and forms the central part of the motor. The armature winding (1) is enclosed in the motor housing (2) which is capable of rotating around the armature winding (1). The housing (2) carries permanent magnets (3) which form an excitation flux. Alternatively, it is possible to use excitation windings instead of permanent magnets. Further, the fixed armature winding (1) is connected through wires to a collector (4) which is also fixed. Brushes (5) installed on a rotating ring (6) interact with the collector (4). The brushes (5) also interact with corresponding solid fixed collector rings (7) which are connected to respective polarity wires (8a, 8b) of the power cable. Each brush (5) can be made of two separate brushes connected to each other. One of these brushes interacts with the collector (4) and the other one interacts with the corresponding collector ring (7). Although the example shown on the drawing provides for two separate collector rings, it is possible to use one ring containing two collector tracks which are separated from each other and are connected to respective wires of the power cable. The collector tracks are used for the sliding of respective brushes. The collector tracks can be located on the outside and on the inside of the ring, on the end surfaces of the ring or on the same surface of the ring. The fixed collector (4), the rotating ring (6) containing the brushes (5), and the fixed collector rings (7) are enclosed in an insulating chamber (9). To facilitate the maintenance of the brushes and the collector, the chamber is made detachable (not shown) and the detachment points are sealed, using any known static sealing means. The insulating chamber can be connected to the winding by means of a disconnect connection (e.g. a threaded connection, clip connection, etc.) or by means of a permanent connection (e.g. a soldered connection, glued connection, etc.). However, a disconnect connection is preferable as it facilitates the maintenance. The methods of making the above connections are well-known and are not detailed herein.

In the above example, the power cable wires (8a, 8b) to be connected to the collector rings (7) pass through the wall of the insulating chamber (9). The points where the wires (8a, 8b) pass through the wall of the insulating chamber (9) are sealed, using static seals (not shown), so the insulating chamber (9) remains sealed. Alternatively, it is possible to provide for a disconnect connection (not shown) in the wall of the insulating chamber (9) to connect the power cable wires. A plug-in connection can be used as such a disconnect connection. Thanks to such a disconnect connection, the motor can be rather easily and quickly connected to/disconnect from the power cable and, consequently, rather easily and quickly mounted/dismantled in the borehole.

The armature winding (1) and the collector (4) are also connected to each other through wires (10) which pass through the wall of the insulating chamber (9). The points where the wires (10) pass through the wall of the insulating chamber (9) are also reliably sealed, using static seals (not shown). Besides, a disconnect connection (e.g. a plug-in connection) can also be provided for in the wall of the insulating chamber (9) to allow an easy and quick electric disconnection of the motor parts for maintenance or replacement purposes. The insulating chamber, the collector, the armature winding and the motor housing are installed coaxially and their common axis coincides with the direct axis of the motor.

FIG. 1 shows an example of the embodiment of the motor, which uses a mechanical component (11) to drive the brushes (5). The mechanical component (11) transmits the rotation from the rotating housing (2) of the motor to the ring (6) and, consequently, to the brushes (5) through the wall of the insulating chamber (9). In this example, the mechanical component (11) is a shaft (12) with toothed gears (13) which are fixed on its ends and which mesh with the teeth made on the motor housing (2) and, consequently, on the rotating ring (6). Rotating seals (14) are provided for in the wall of the insulating chamber (9) to seal the shaft (12). Alternatively, the rotation can be transmitted by using a friction gear, a tongue-and-groove gear, etc. instead of a toothed gear. The rotation can also be transmitted by means of magnetic interaction between the rotating ring (6) or the rotating housing (2) and the shaft (12) or gear components installed on the shaft.

Figure 2:
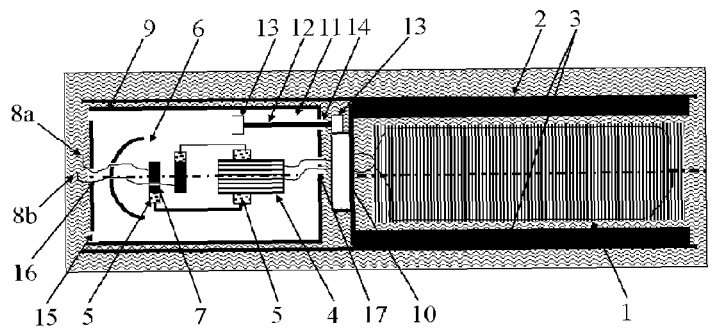
FIG. 2 shows a submersible electric motor with magnetically rotated brushes.

The example of the embodiment of the motor, shown on FIG. 2, represents another way to transmit the rotation from the motor housing (2) to the rotating ring (6). In this embodiment, the housing (2) has a lateral surface area (2a) which is spaced from the outside surface of the insulating chamber (9). The motor housing (2) and the insulating chamber (9) are made in the form of rotation bodies (preferably, in the form of a circular cylinder). Permanent magnets (15) are fixed at the area (2a) of the housing (2) and interact through the wall of the insulating chamber (9) with permanent magnets (16) installed on the rotating ring (6). So, the magnets (15, 16) form a magnetic coupling. Alternatively, it is possible to use electromagnets as the sources of magnetic field in the magnetic coupling. There are no moving parts passing through the wall of the insulating chamber in the example of the embodiment, shown on FIG. 2. As a result, the insulating chamber is fully sealed, using static seals only, which provides a more reliable separation of the insulating chamber from a liquid medium or a gas-liquid medium, especially in case of high pressure or high corrosiveness of this medium.

When a magnetic coupling is used in the electric motor shown on FIG. 2, the walls of the insulating chamber (9) should be made of a material having low ferromagnetic properties and low conductivity characteristics. Plastics, composite materials and ceramic materials, stainless steel, titanium, bronze, etc. can be used as the most preferable materials.

When a magnetic coupling is used, the brushes (5) lag behind the rotating housing (2) during the acceleration of the motor (particularly, during the start-up of the motor), due to the friction of the brushes (5) against the collector (4) and due to inertia that occurs during the acceleration. As a result of this lag or, consequently, of an error in the angular position of the magnets (15) installed on the housing (2) and the magnets (16) installed on the rotating ring (6), the armature winding (2) is not connected in accordance with the required position of the rotating housing (2). Due to the lag, some wires of the armature winding (2) are connected in reverse direction as compared with the required switching position. The lag therefore reduces the torque of the motor during the acceleration of the motor (particularly, during the start-up), thus reducing the risk of failure of the motor shaft or the tubing to which the motor and the pump driven by the motor is connected, due to a great moment of inertia.

Figure 3:
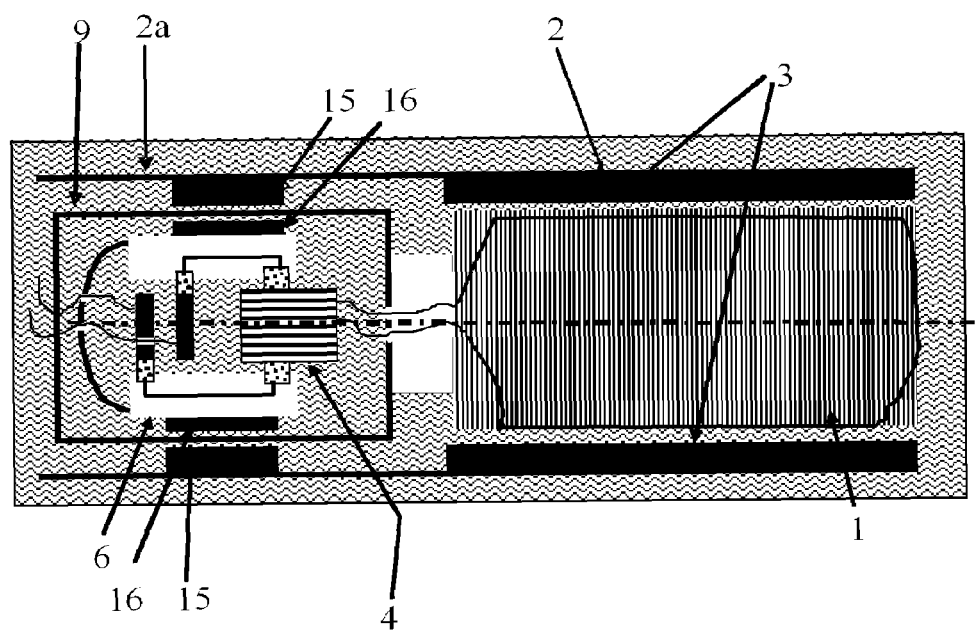
FIG. 3 shows a submersible electric motor equipped with a magnetic coupling and a permanent-lag correcting system.

FIG. 3 shows another example of the embodiment of the motor equipped with a magnetic coupling. In this embodiment, the magnetic coupling is formed by an external permanent magnet (15) which is fixed on the motor housing (2), and an internal magnet (17) which is fixed on an intermediate disk (18). The rotatable intermediate disk (18) is installed between the collector (4) and the wall of the insulating chamber (9) whose outside surface faces the armature winding (2). The rotatability can be achieved, using any means which are obvious to any specialist in this art. For example, a shaft can be installed in a fixed position in the insulating chamber (9) to support the intermediate disk via bearings. Alternatively, the shaft can rotate and the intermediate disk can be installed thereon in a fixed position.

A torsion spring (19) is installed between the intermediate disk (18) and the rotating ring (6) containing the brushes (5). When the motor accelerates under the torque which is required for the acceleration of the brushes (5), the torsion spring (19) twists, which results in an even greater lag. Consequently, the torsion spring further reduces the risk of failure of the motor shaft and/or the tubing.

The example of the embodiment, shown on FIG. 3, also provides for a permanent-lag correcting system. This correcting system is intended for elimination of the lag which results from the friction of the brushes (5) against the collector (4) (frictional lag). Although frictional lag has some positive effect during the acceleration, but it generally limits the maximum allowable torque of the motor. According to the example of the embodiment, shown on FIG. 3, the permanent-lag correcting system includes two stationary alternating-current generators (20, 21) which are installed inside the insulating chamber (9), and a correcting electromagnet (23) which is electrically connected to the generators. In a preferable case, both generators are windings. One of the generators is driven by external magnets (22) installed on the rotating housing (2) of the motor, and the other one is driven by internal magnets (17) installed on the intermediate disk (18). The external magnets (22) are aligned with respect to the external magnets (15) of the magnetic coupling. The generators (20, 21) are installed in such a way that their output powers are equal and their phases are opposite in case of a fully aligned magnetic coupling. In this case, the total of the two output powers is equal to zero and no current passes through the correcting electromagnet (23). If there is an angular deviation between the magnets (15) and (17) of the magnetic coupling, the output powers of the generators (20, 21) are different, which results in a voltage difference at the output. In accordance with the voltage difference value, current passes though the electromagnet (23) and this current is high enough to perform angular correction of the relative position of the magnets (15) and (17).

Alternatively, both groups of magnets to be used for interaction with the generators can be external magnets and internal magnets of the magnetic coupling. Also, both groups of magnets to be used for interaction with the generators can be magnets which are spaced from and are aligned with respect to the magnets of the magnetic coupling. In this case, the magnets to be used for interaction with the generators are naturally installed on the same rotating parts of the motor, as the magnets of the magnetic coupling.

As an alternative embodiment, it is possible to form the correcting system by using magnetic field sensors based on other non-inductive physical principles. Hall sensors which are used for determination of angular positions of the external magnets of the magnetic coupling can be used as such magnetic field sensors.

The permanent-lag correcting system is equipped with low-pass filters (not shown). The low-pass filters eliminate the correction during the acceleration (start-up) in order to avoid mutual cancellation of the brush friction correction effect and temporary lag effect.

The embodiment of the motor, shown on FIG. 3, can be promising if used as a generator for downhole measurements while drilling. In this case, the angular adjustment allows adjustment of the output voltage of the system. The angular position is set by applying the output voltage of the armature winding to the correcting electromagnet.

It is obvious that the embodiments described above are not to be regarded as a limitation of the scope of patent claims of the invention. Any specialist in this art understands that it is possible to introduce a lot of modifications into the above submersible direct-current electric motor without deviating from the principles of the invention claimed in the summary of the invention.

The invention claimed is:

1. A submersible direct-current electric motor which includes:
    an armature winding which is fixed and forms the central part of the motor;
    a housing which encloses the armature winding and is capable of rotating around the armature winding;
    magnetic field generation means which are fixed in the housing and are capable of interacting with the armature winding to generate electromagnetic torque;
    a collector which is made fixed and is electrically connected to the armature winding; and
    brushes which are capable of rotating around and sliding along the fixed collector;
    wherein the brushes are connected to the external electric circuit;
    and the fixed collector, together with the brushes capable of rotating around it, is enclosed in an insulating chamber.

2. An electric motor as claimed in claim 1, characterized in that a fixed collector ring is provided for in the insulating chamber in order to connect the power cable to the brushes.

3. An electric motor as claimed in claim 2, characterized in that the collector ring is made of two separate ring elements, each of them being connected to the respective polarity wire of the power cable and being used for the sliding of respective brushes.

4. An electric motor as claimed in claim 2, characterized in that the collector ring is equipped with two tracks which are separated from each other and are used for the sliding of respective brushes, each track being connected to the respective polarity wire of the power cable.

5. An electric motor as claimed in claim 1, characterized in that the brushes are installed in a rotatable ring.

6. An electric motor claimed in claim 5, characterized in that the brushes installed in the ring are removable.

7. An electric motor as claimed in claim 2, characterized in that the each brush is made in the form of a single brush which contacts the collector ring and the collector at the same time.

8. An electric motor as claimed in claim 2, characterized in that the each brush is made in the form of two separate brushes which are electrically connected to each other, wherein one of these brushes interacts with the collector ring, and the other one interacts with the collector.

9. An electric motor as claimed in claim 2, characterized in that the collector ring and the power cable are connected though an intermediate connection made in the wall of the insulating chamber.

10. An electric motor as claimed in claim 9, characterized in that the intermediate connection is a plug-in connection.

11. An electric motor as claimed in claim 1, characterized in that the brushes are rotated by a mechanical means comprising a rotatable shaft installed in the wall of the insulating chamber, wherein the shaft interacts with the housing and, either directly or indirectly, with the brushes, using force closure, form closure or a combination thereof.

12. An electric motor as claimed in claim 1, characterized in that the brushes are rotated by magnetic means comprising external magnets and internal magnets, wherein the external magnets are installed on the motor housing and the internal magnets are placed inside the insulating chamber and are connected to the brushes either directly or indirectly such that the external and internal magnets form a magnetic coupling.

13. An electric motor as claimed in claim 12, characterized in that the walls of the insulating chamber are made of a material having low ferromagnetic properties and low conductivity characteristics.

14. An electric motor as claimed in claim 12, characterized in that an elastic coupling is provided for between the magnetic coupling and the brushes.

15. An electric motor as claimed in claim 12, characterized in that the external and internal magnets of the magnetic coupling are capable of adjusting their angle error by using a permanent-lag correcting system.

16. An electric motor as claimed in claim 12, characterized in that the permanent-lag correcting system includes an electromagnet and two alternating-current generators, one reacting to the movement of the external magnets, and the other one reacting to the movement of the internal magnets wherein the generators are installed in such a way that their output powers are equal and their phases are opposite in case of a fully aligned magnetic coupling, which results in no current on the correcting electromagnet.

17. An electric motor as claimed in claim 16, characterized in that the permanent-lag correcting system also includes low-pass filters.

* * * * *